(12) United States Patent
Eppich et al.

(10) Patent No.: US 6,494,701 B2
(45) Date of Patent: Dec. 17, 2002

(54) INJECTION MEANS FOR AN INJECTION MOULDING MACHINE

(75) Inventors: Stefan Eppich, Arbing (AT); Alfred Ellinger, Perg (AT); Johannes Frechinger, Katsdorf (AT)

(73) Assignee: Engel Maschinenbau Gesellschaft m.b.H., Schwerberg/Arbing (AT)

( * ) Notice: Subject to any disclaimer, the term of this patent is extended or adjusted under 35 U.S.C. 154(b) by 47 days.

(21) Appl. No.: 09/827,461

(22) Filed: Apr. 6, 2001

(65) Prior Publication Data

US 2001/0038868 A1 Nov. 8, 2001

(30) Foreign Application Priority Data

May 2, 2000 (EP) .......................................... 00109331

(51) Int. Cl.[7] ............................................. B29C 45/77
(52) U.S. Cl. ........................ 425/145; 264/40.7; 425/149
(58) Field of Search ................................. 425/145, 149; 264/40.7

(56) References Cited

U.S. PATENT DOCUMENTS 4,961,696 A * 10/1990 Yamamura .................. 425/149
5,206,034 A     4/1993  Yamazaki
5,209,936 A     5/1993  Ihara et al.
5,417,558 A *   5/1995  Heindel et al. ............. 425/145

FOREIGN PATENT DOCUMENTS

| EP | 0230488  | 8/1987 |
| EP | 0260328  | 3/1988 |
| EP | 0331735  | 9/1989 |
| EP | 0350872  | 1/1990 |
| JP | 60174625 | 9/1985 |
| JP | 2016023  | 1/1990 |
| JP | 06039891 | 2/1994 |

* cited by examiner

*Primary Examiner*—Tim Heitbrink
(74) *Attorney, Agent, or Firm*—Notaro & Michalos P.C.

(57) ABSTRACT

An injection moulding machine with a screw (3) for metering plastics, which is mounted in a rotatable manner in a clamping plate (8), which is longitudinally displaceable by way of at least two electrically driven spindles (5), whereby the pressure exerted by the plastics upon the screw (3) is determined by means of at least one sensor (14; 15) which measures the deformation of a connecting ring arranged between a stationary sleeve (9) surrounding the pivot bearing (16) of the screw (3) and the clamping plate (8); the connecting ring is configured as an annular disc (10), the inner edge (11) of which is connected to the sleeve (9) and the outer edge (12) of which is connected to the clamping plate (8).

4 Claims, 4 Drawing Sheets

INJECTION MEANS FOR AN INJECTION MOULDING MACHINE

FIELD AND BACKGROUND OF THE INVENTION

The invention relates to an injection means for an injection moulding machine with a screw for metering plastics which is mounted in a rotatable manner in a clamping plate, which is longitudinally displaceable by means of at least two electrically driven spindles, wherein the pressure exerted upon the screw by the plastics is determined by at least one sensor which measures the deformation of a connecting ring arranged between a stationary sleeve surrounding the pivot bearing of the screw and the clamping plate.

With hydraulically driven injection moulding machines, one can assume that the hydraulic pressure translates into the pressure prevailing in the plastics. The pressure in the plastics can consequently be worked out from the hydraulic pressure, which renders the use of expensive and vulnerable sensors in the moulding space superfluous. With electrically driven injection moulding machines, on the other hand, it was considered for a time that the torque supplied by the drive, which determines the pressure in the plastics would be satisfactorily determined by the instantaneous current intensity. Actually, however, energy is periodically taken up and given out by the motor itself, so although by monitoring the current intensity an average torque and thereby an average pressure in the material can be determined, monitoring the injection procedure simply by monitoring the current taken up by the motor is problematic.

For the reasons described, it was realised relatively early on that in order to monitor the injection and retention pressure, the pressure occurring in the screw or the pressure exerted by the screw had to be measured (see JP 60-174625 Nissei, EP 0 230 488 A1). With an apparatus of the type defined in the introduction, as is shown, for example, in EP 0 260 328 A1, there is a problem in the configuration and arrangement of the sensors in that the injection and retention pressure results from the application of a force which, although less than the mould closing pressure, can easily be greater than 100 kN, even with average-sized machines. As this pressure must be taken up by the connecting ring between the stationary part of the pivot bearing of the screw and the clamping plate, without the precise orientation of the screw suffering, it has been assumed that this connecting ring is constructed in a solid manner and has to be arranged in the axial direction between the bearing sleeve and clamping plate. In particular, this connecting ring was constructed integrally with the bearing sleeve of the pivot bearing of the screw (see JP-7-67722 Niigata).

The known arrangement of pressure sensors has the disadvantage that the back pressure that occurs during plasticizing and metering of the plastics is an order of magnitude less than the injection and retention pressure, and the deformation of the connecting ring, configured in a known manner, between the bearing sleeve and clamping plate does not deliver a satisfactorily clear signal. The invention avoids this disadvantage in that the connecting ring is configured as an annular disc, the inner edge of which is connected to the sleeve and the outer edge of which is connected to the clamping plate.

The disc-shaped construction of the connecting ring deformed by the pressure of the plastics firstly results in a considerable relative displacement of the screw and clamping plate, when the screw is acted upon by means of the clamping plate. The displacement represents the measurement which can be easily registered by means of expansion measuring strips fitted in the annular disc itself, or by known apparatuses for monitoring the relative position of two machine parts. This is particularly the case when the cross-section of the annular disc is reduced in the central area. In the peripheral and radial direction, the annular disc according to the invention has great stability, so despite its considerable deformation in the longitudinal direction, the precision of the shaft mounting is not affected.

BRIEF DESCRIPTION OF THE DRAWINGS

Details of the invention will be explained hereinafter with reference to the drawings. In these.

DETAILED DESCRIPTION OF THE INVENTION

Figure 1:
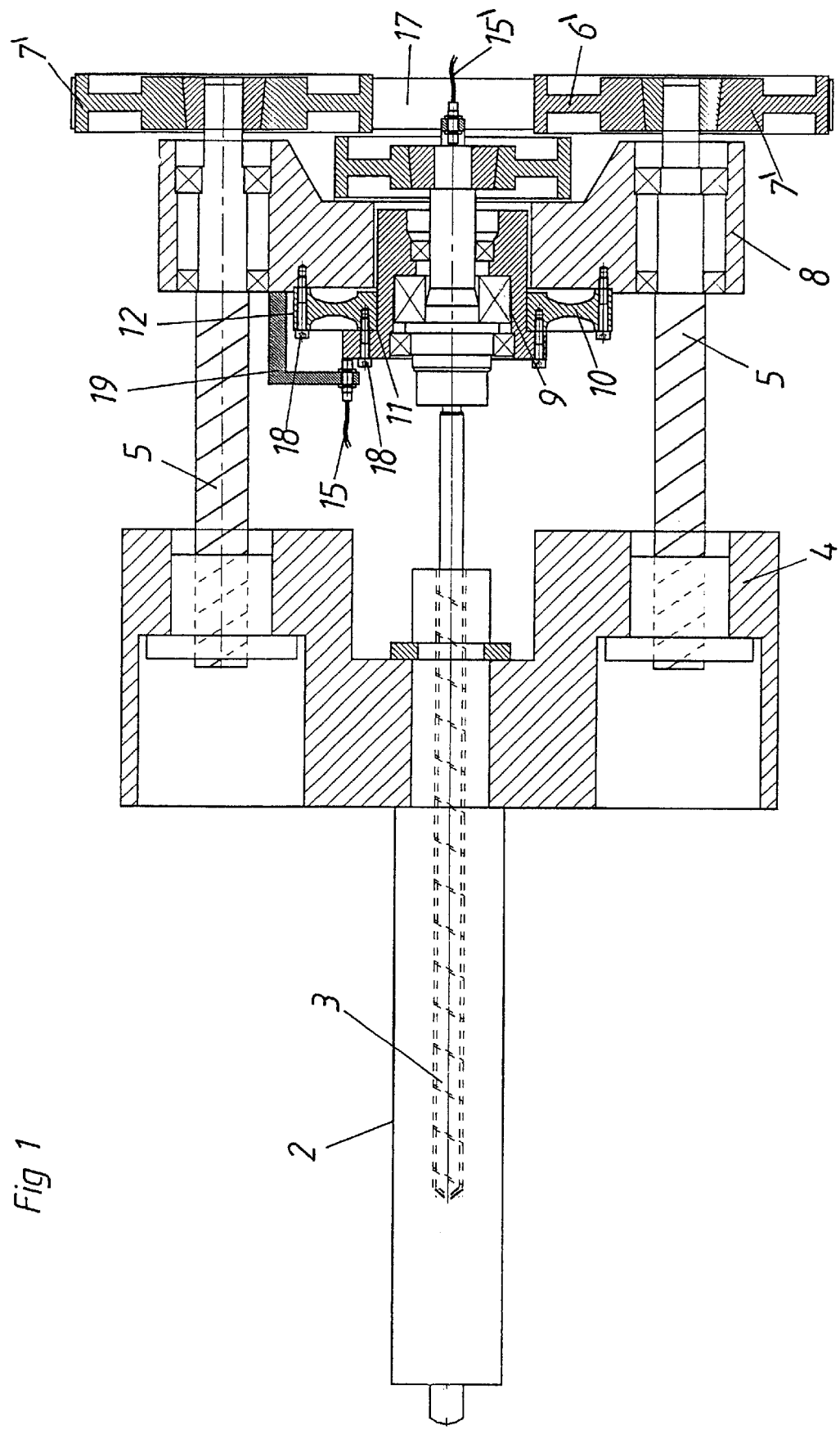
FIG. 1 shows a horizontal section of the important parts of an injection means according to the invention, FIG. 2 the corresponding vertical section, FIG. 3 the associated view from the right in FIG. 2.
Figure 2:
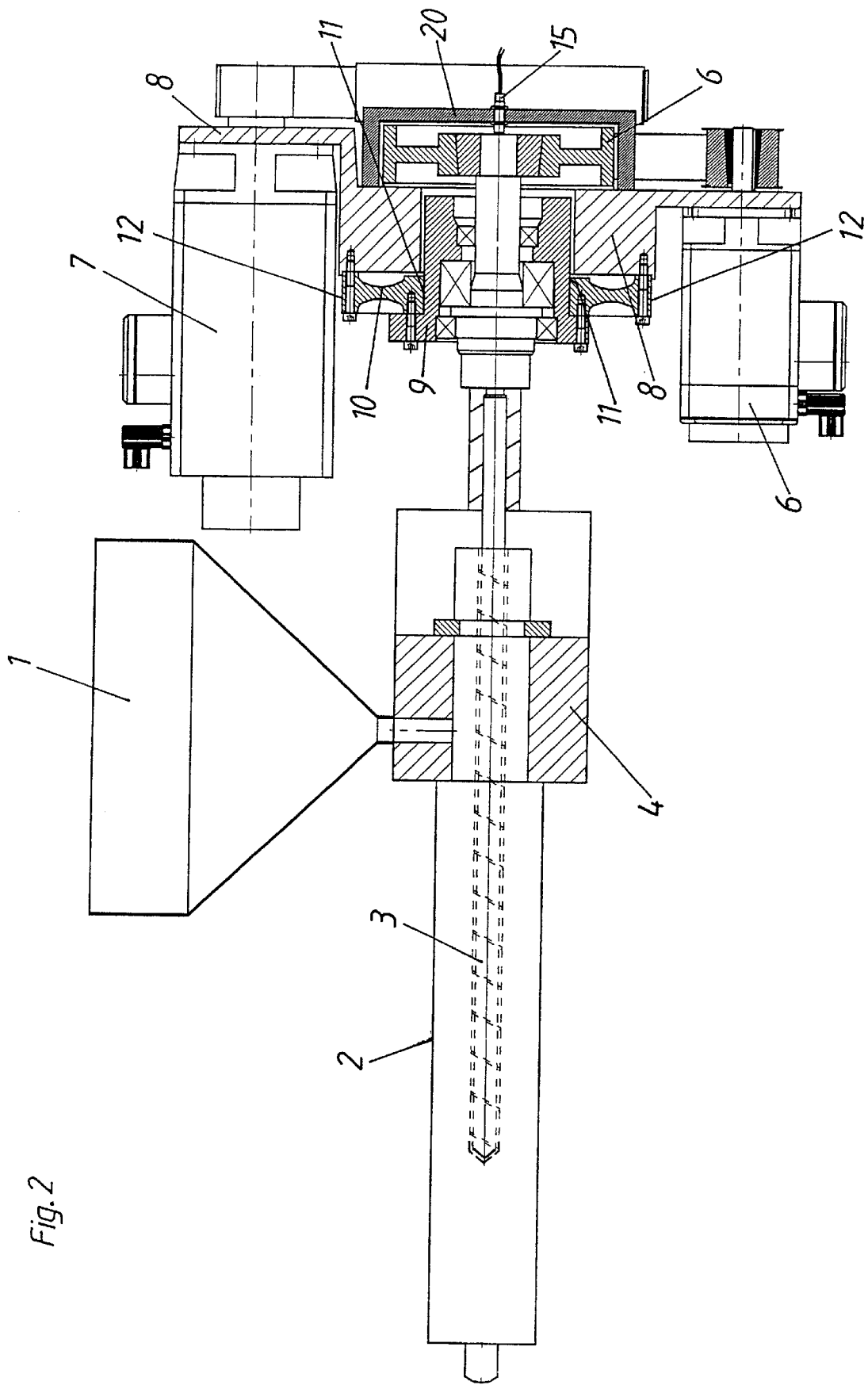
Figure 3:
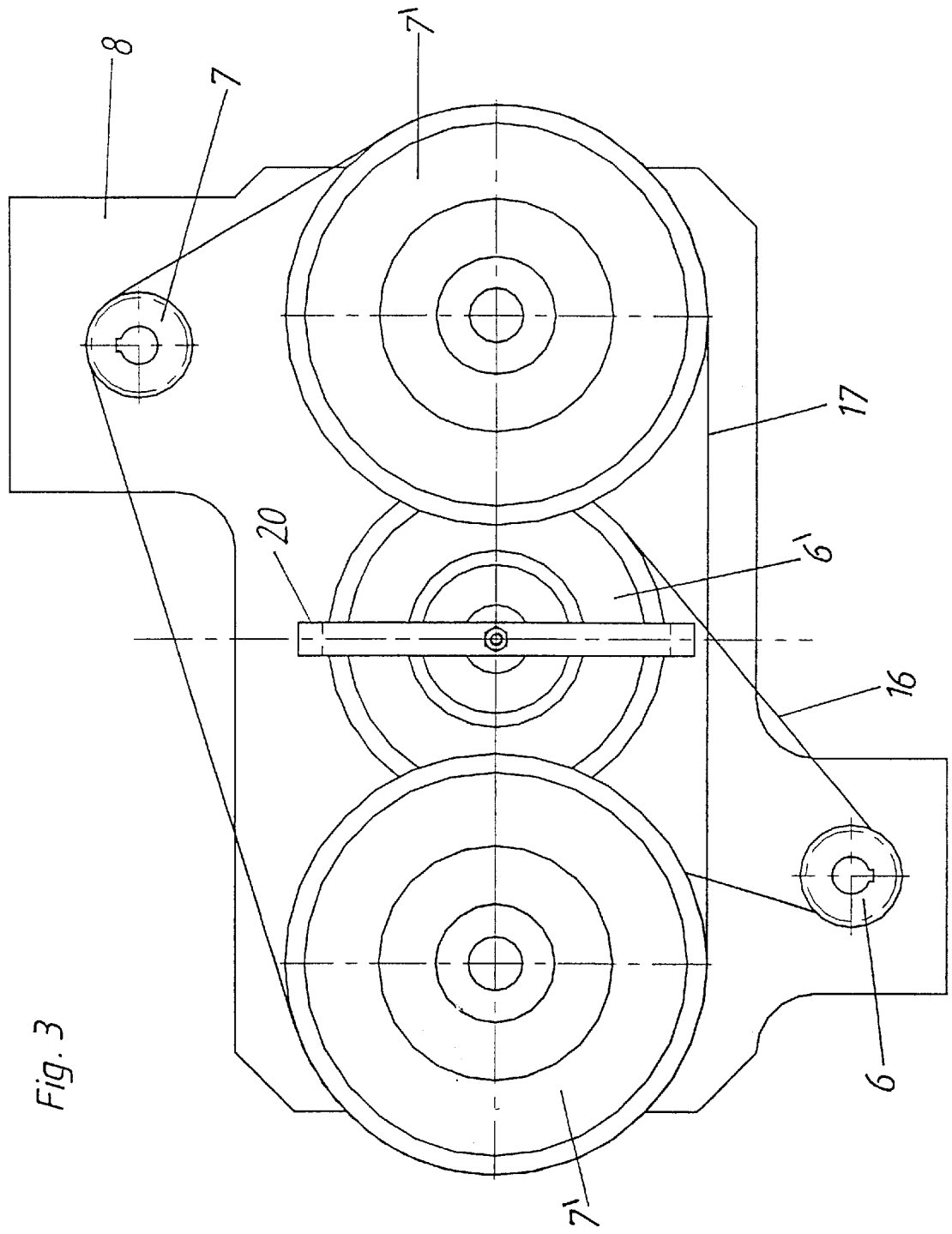

The injection means shown in FIGS. 1–3 is largely conventional per se, and therefore does not need to be described in detail. It has a screw 3 which is mounted in a rotatable and longitudinally displaceable manner in a mass cylinder 2. Plastics supplied through the funnel 1 to the screw 3 is plasticized by the rotation of the screw 3 and collected in the screw vestibule until it is injected into the mould hollow, which is not shown, by forward displacement of the screw. During metering and injection of the plastics, the carrier plate 4 which is connected to the mass cylinder 2 remains immobile. The end of the screw 3 is mounted in a clamping plate 8 on which the screw 3 is supported. The clamping plate 8 in turn is supported in the carrier plate 4 by means of spindles 5. Driving of the spindles 5 is done via the v-belt 17 and the drive wheels 7' by means of a servo-motor 7, which follows the movement of the clamping plate 8. Also connected to the clamping plate 8 is the metering drive 6 rotating the screw 3, which drives the drive wheel 6' by means of the v-belt 16.

The end of the screw 3 is mounted in a bearing which is not of further interest here, which is surrounded by a stationary sleeve 9. The connection of the sleeve 9 and the clamping plate 8 is by means of an annular disc 10. The cross-section of this annular disc corresponds approximately to that of an I-beam. Its inner edge 11 is connected to the sleeve 9, its outer edge 12 to the clamping plate 8 by screws 18.

In the injection procedure, the clamping plate 8 is moved to the left by the motor 7 by means of the spindles 5, whereby a pressure occurs in the plastics in front of the screw 3 which leads to deformation of the annular disc 10. If, on the other hand, the screw 3 is made to rotate by the metering motor 6, the plastics collecting in front of the screw exerts a back pressure which is kept in bounds by movement of the clamping plate 8 to the right. Again, this results in deformation of the annular disc 10.

Figure 4:
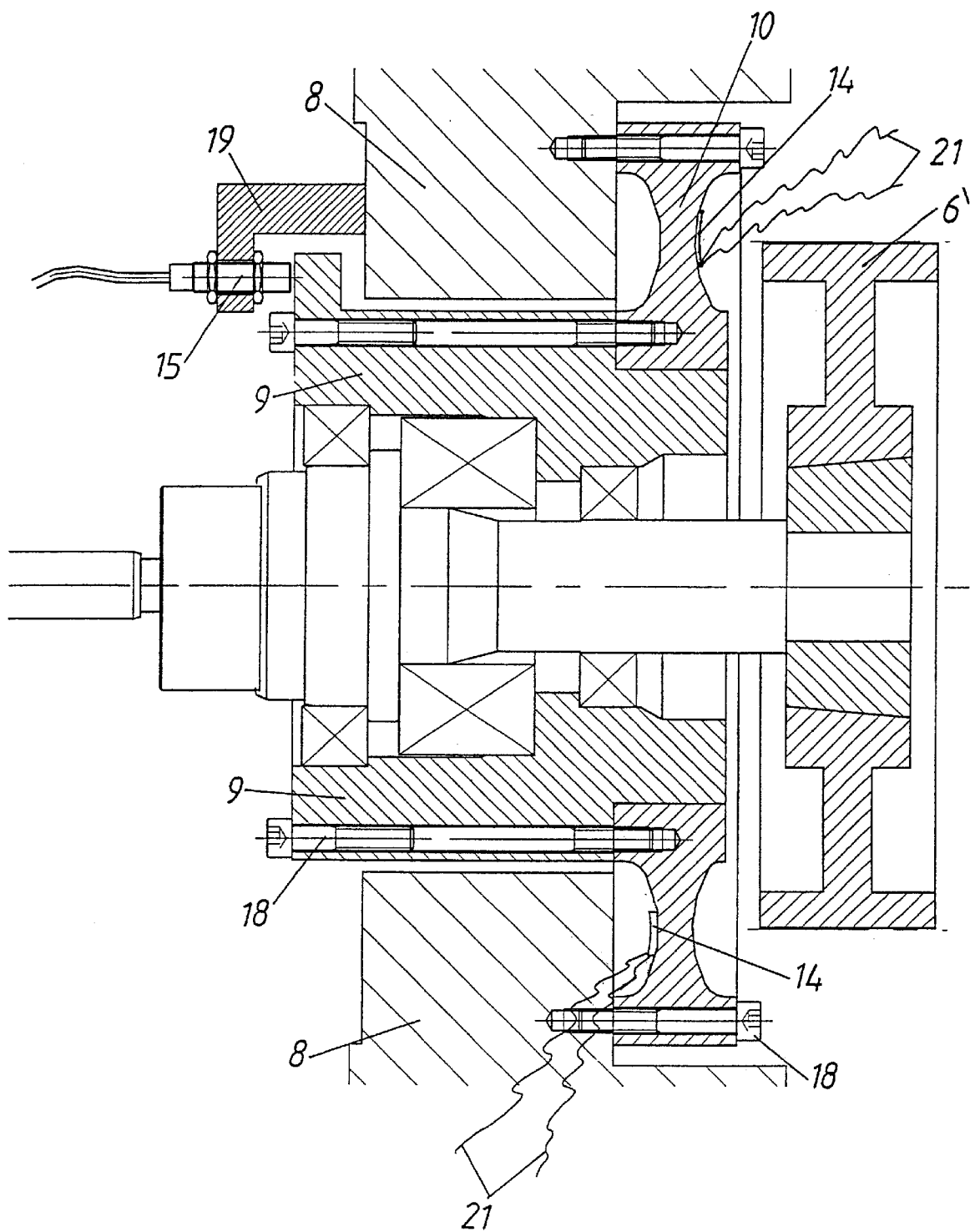
FIG. 4 is an enlarged portion of a horizontal section through a second embodiment of the invention.

The annular disc 10 can, as shown in FIGS. 1–3, be arranged on the front side of the clamping plate 8, or, as in the embodiment according to FIG. 4, on its rear side. It is important for the invention that the annular disc 10 enables a relatively large axial displacement between the sleeve 9 and clamping plate 8, which can be determined by suitable sensors. FIG. 1 shows two sensors 15 and 15' respectively, configured as distance measuring devices. The sensor 15 then measures in an inductive manner the distance between the sleeve 9 and a supporting angle 19 connected in a fixed manner to the plate 8. The sensor 15', on the other hand, is connected in a fixed manner to the plate 8 by means of the bracket 20, and measures the distance from the drive wheel 6' which is not longitudinally displaceable with respect to the sleeve 9. The arrangement of several sensors 15, 15' is meaningful, as their results can be averaged.

In the embodiment according to FIG. 4, as opposed to FIGS. 1–3, firstly the annular disc 10 is moved to the rear side of the clamping plate 8. In addition to the sensor 15, in this instance expansion measuring strips 14 are provided which are connected via lines 21 to evaluating circuitry. From the deformation established, this calculates the force acting upon the screw 3, and thereby the pressure prevailing in the plastics.

What is claimed is:

1. Injection means for an injection moulding machine with a screw (3) for metering plastics, which is mounted in a rotatable manner in a clamping plate (8), which is longitudinally displaceable by means of at least two electrically driven spindles (5), wherein the pressure exerted by plastics upon the screw (3) is determined by at least one sensor (14; 15) which measures the deformation of a connecting ring arranged between a stationary sleeve (9) surrounding the bearing of the screw (3) and the clamping plate (8), characterised in that the connecting ring is configured as an annular disc (10), the inner edge (11) of which is connected to the sleeve (9), and the outer edge (12) of which is connected to the clamping plate (8).

2. Injection means according to claim 1, characterised in that the cross-section of the annular disc (10) reduces with increasing distance from the edges (11 and 12).

3. Injection means according to claim 1, characterised in that the at least one sensor (14) is fitted on the annular disc (10) in the form of an expansion measuring strip.

4. Injection means according to claim 1, characterised in that the at least one sensor (15, 15') determines the relative position of the sleeve (9) and clamping plate (8) in the direction of the screw (3).

* * * * *